United States Patent

[11] 3,614,654

| [72] | Inventors | Warren Gronros<br>Bernardsville;<br>Edward J. Walsh, Morris Plains, both of N.J. |
|---|---|---|
| [21] | Appl. No. | 310,268 |
| [22] | Filed | Sept. 20, 1963 |
| [45] | Patented | Oct. 19, 1971 |
| [73] | Assignee | Bell Telephone Laboratories Incorporated<br>New York, N.Y. |

[54] DIRECT-CURRENT GASEOUS OPTICAL MASER STRUCTURE
12 Claims, 6 Drawing Figs.

| [52] | U.S. Cl. | 331/94.5 |
| [51] | Int. Cl. | H01s 3/02 |
| [50] | Field of Search | 331/94.5; 250/199; 313/220, 204 |

[56] References Cited
UNITED STATES PATENTS

| 3,262,004 | 7/1966 | Keller | 331/94.5 |
| 2,162,505 | 6/1939 | James et al. | 313/204 |
| 3,242,439 | 3/1966 | Rigden et al. | 331/94.5 |

*Primary Examiner*—William L. Sikes
*Attorneys*—R. J. Gueniher and Arthur J. Torsiglieri ABSTRACT: A direct-current gaseous optical maser comprises an elongated hollow cylinder that is open on both ends for defining a usable gas discharge path portion. A cathode and an anode are set back from the two ends within enclosures so that the gas discharge follows an approximately U-shaped path from the cathode through one open end of the cylinder and a similar path from the other open end to the anode.

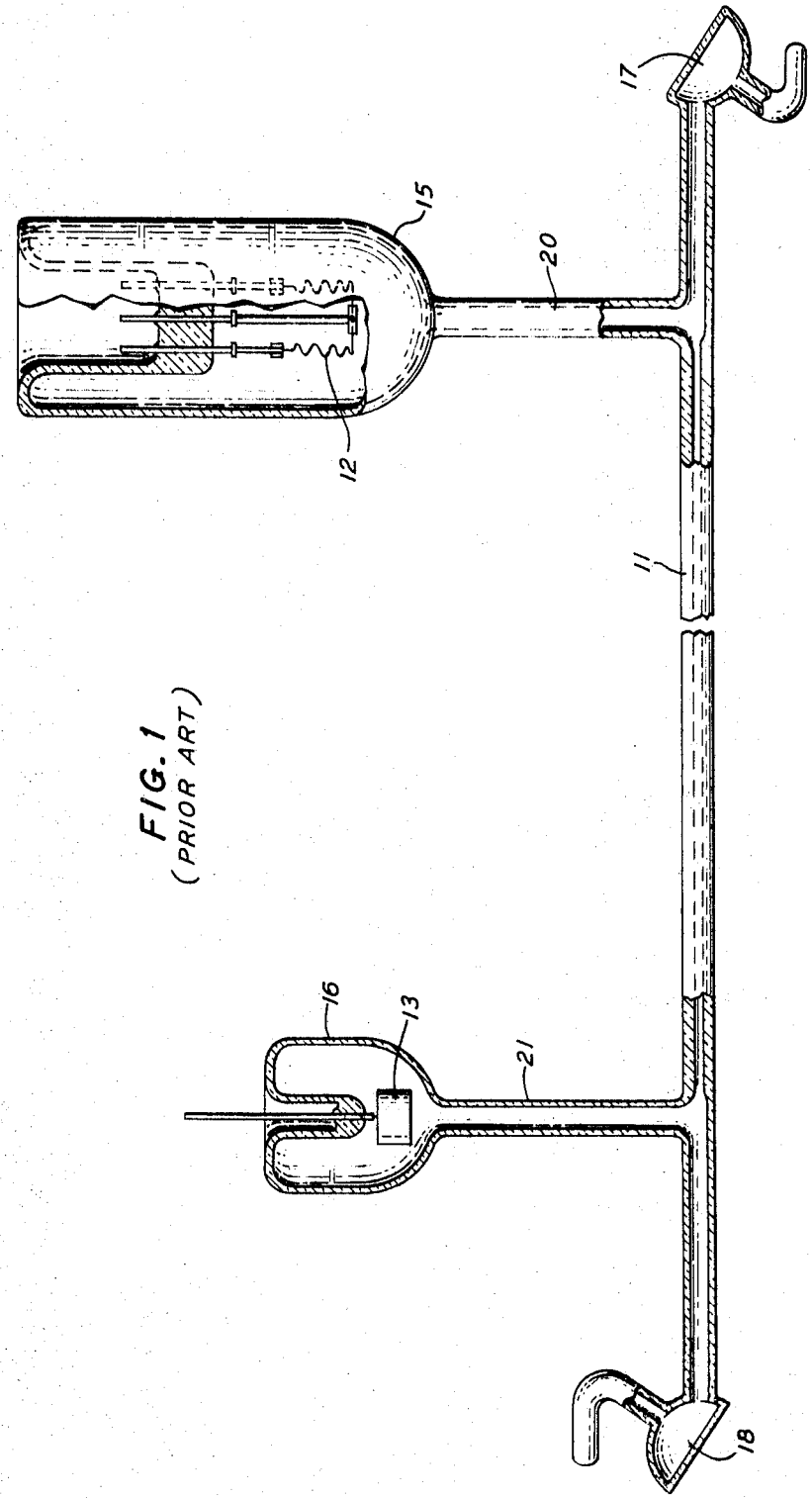

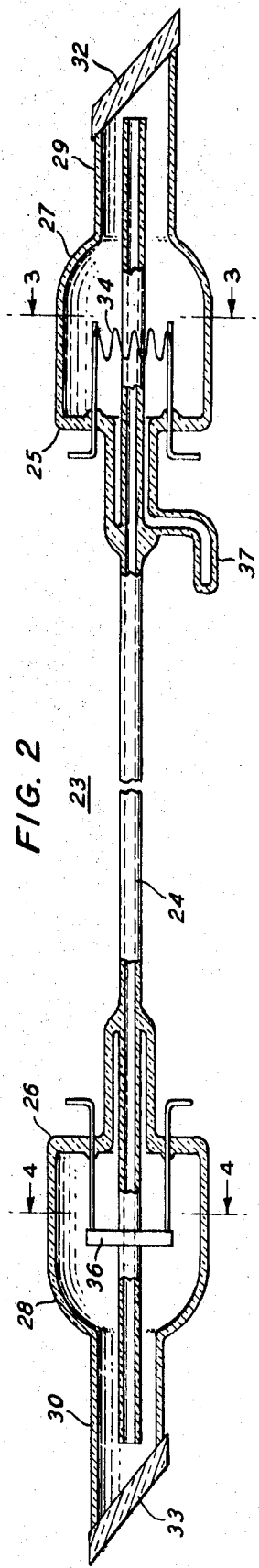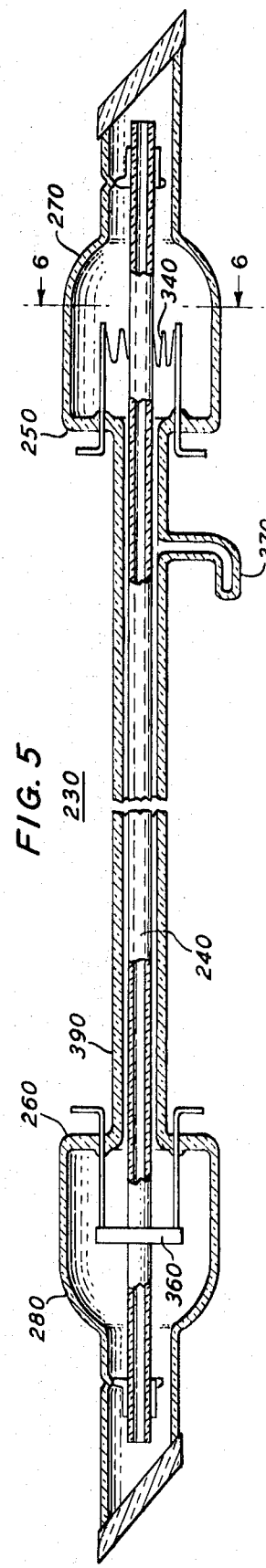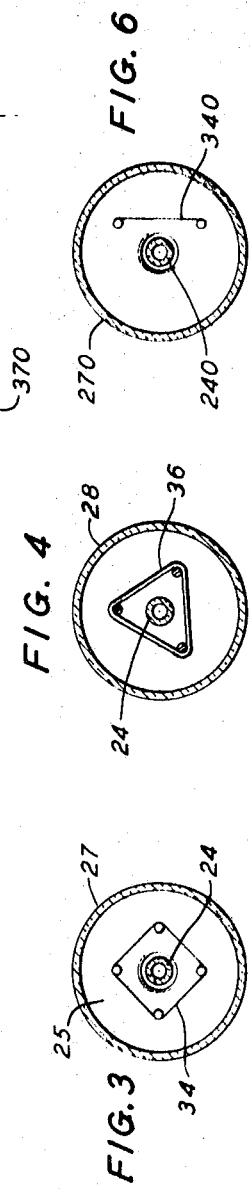

DIRECT-CURRENT GASEOUS OPTICAL MASER STRUCTURE

This invention relates to gas discharge devices, and more particularly, to direct current excited gaseous optical maser structures.

The optical maser, or laser, is a relatively recent invention far-reaching technological importance because of its ability to amplify light waves and to produce coherent light frequency oscillations. One type of optical maser is the direct current excited gaseous optical maser which is described, for example, in the application of A. Javan, Ser. No. 277,651, filed May 2, 1963 and assigned to Bell Telephone Laboratories, which comprises a form of gas discharge tube filled with a gas that is capable of population inversion. Population inversion refers to the excitation of an abnormally high proportion of atoms to a predetermined high-energy state. As the atoms decay to more stable energy levels, optical radiation at a predetermined frequency is stimulated through a sort of cascading chain reaction phenomenon among the atoms. Such stimulated emission of radiation may be used for generating coherent light or for amplifying light waves of a frequency corresponding to the radiation frequency. Terms such as "light energy" and "optical frequency" as used herein, are not intended to be limited to frequencies within the visible light spectrum, but may also include infrared and ultraviolet frequencies.

In a direct current gaseous optical maser, gas atoms within an elongated hollow cylinder are excited by establishing a gas discharge between a cathode and an anode that are located at opposite ends of the cylinder. When the device is used as an amplifier, light is directed through a window at one end of the cylinder and becomes amplified as it passes through the gas discharge region, the gain being roughly proportional to the length of the discharge region through which it passes. The amplified light may be taken directly from the output end of the cylinder or it may be reflected back through the cylinder to give additional gain if so desired.

Mechanical fabrication of a device of this type is normally quite complex because the anode and cathode cannot be permitted to interfere with the light transmitted through the linear gas discharge region. The cathode and anode are therefore located in individual appendages on opposite ends of the central cylinder. Both of these appendages are rather awkward and bulky because the electrodes must be sufficiently removed from the optical windows to prevent cathodic and anodic sputtering of material onto the windows and the cylinder. Moreover, the cathode dark space, a region of gas discharge inhomogeneities adjacent the cathode, should not be permitted to extend into the usable discharge region because it can interfere with the desired maser action. The appendages are usually quite fragile because, while they must support the relatively large electrodes, they still should have an inner diameter which is small enough to define a discharge region that approximates that in the normally small-bore central cylinder. Finally, the mechanical length of the tube invariably substantially exceeds the usable gas discharge length because of the bulk of the two electrodes and because the two windows must be sufficiently removed from the electrodes to avoid the accumulation of sputtered material. All of these factors result in a device which is rather fragile and bulky in relation to the usable discharge region.

It is an object of this invention to reduce the bulk and fragility of a direct current excited gaseous optical maser.

It is another object of this invention to decrease the overall length for a given discharge length of a direct current excited gaseous optical maser.

These and other objects of the invention are attained in one illustrative embodiment comprising an elongated hollow central cylinder for defining a linear gas discharge path portion through which light waves may propagate. A cathode is located in an enclosure which surrounds one open end of the cylinder, while another enclosure surrounding the other open end contains an anode. Both of the enclosures comprise a cylindrical portion which contains an optically transparent window for admitting light to the hollow cylinder, and a bulbous portion which is hermetically sealed to the cylinder. Both of the bulbous portions are set back from the open end of the cylinder with one of them containing the cathode and the other one containing the anode. Both the anode and cathode may surround the central cylinder, giving the device a mechanical symmetry which minimizes its bulk and fragility.

Both of the optical windows are on the central axis of the cylinder and are removed from the open end a distance which is just sufficient to permit a free gaseous breakdown therebetween, as is required for sustaining a gaseous discharge. The cylinder and the enclosures are filled with an appropriate gas for emitting coherent light wave radiation when excited according to known optical maser principles. With this arrangement, an appropriate voltage between the cathode and anode generates a gas discharge which follows a U-shaped path from the cathode through one open end of the cylinder and a similar path from the other open end to the anode. In addition to enhancing its mechanical strength and compactness, this arrangement gives usable optical maser gain along practically the entire mechanical length of the device.

According to another embodiment of the invention, the middle portion of the cylinder is surrounded by an envelope which is sufficiently close to the cylinder to prohibit the formation of a gas discharge path therebetween. The two enclosures are then sealed to the envelope rather than being sealed to the central cylinder. This embodiment is sometimes desirable because it facilitates the initial evacuation of the tube and the subsequent distribution of gas. Further, it permits the use of relatively gas-permeable quartz as the central cylinder, which may be desired for high heat resistance. The envelope captures any gas that may diffuse through the quartz cylinder, thus extending the tube lifetime.

In both embodiments, the cathode and the anode may both be designed to surround the central cylinder. Alternatively, it may be desirable to displace the cathode from the central cylinder while designing only the anode to surround the central cylinder. Although this may involve some sacrifice of mechanical symmetry, it tends to conserve power input to the cathode by reducing radiation losses, as may sometimes be desired.

These and other objects and features of our invention will be more fully understood from a consideration of the following detailed description, taken in conjunction with the accompanying drawing in which:

FIG. 1 is a cross-sectional view of a direct current excited gaseous optical maser of the prior art;

FIG. 2 is a cross-sectional view of one embodiment of the invention;

FIG. 3 is a section taken along lines 3—3 of FIG. 2;

FIG. 4 is a section taken along lines 4—4 of FIG. 2;

FIG. 5 is a cross-sectional view of another embodiment of the invention; and

FIG. 6 is a section taken along lines 6—6 of FIG. 5.

Turning now to FIG. 1 there is shown a typical direct current excited gaseous optical maser of the prior art comprising a cylinder 11 for defining a linear usable gas discharge region. A cathode 12 and an anode 13 are located within enclosures 15 and 16, respectively, which are attached to the cylinder 11 by constricted portions 20 and 21. The device is filled with an appropriate gas which is suitable for population inversion such as a mixture of neon and helium. An appropriate voltage between the cathode and anode establishes a gas discharge path which extends from cathode 12 through cylinder 11 to anode 13. Located at opposite ends of cylinder 11 are light transparent windows 17 and 18 which are tilted at a proper "Brewster angle" for maximizing transmission efficiency. When the device is used as an amplifier, light waves are admitted to cylinder 11 through either window 17 or 18 and become amplified through the additive effect of the stimulated emission of light energy radiation by the gas atoms. Mirrors may be placed opposite the windows in a known manner for multiplying the amplification or for feeding back a sufficient portion of the energy to permit the device to operate as an oscillator.

It is apparent from FIG. 1 that the conventional direct current excited gaseous optical maser is quite bulky and fragile. The anode and cathode must be located within awkward appendages to the cylinder 11 because no interference with the propagating light wave can be permitted. Further, both the cathode and anode must be removed a considerable distance from the cylinder 11, and particularly from the windows 17 and 18 to limit the effects of cathodic and anodic sputtering; material which is spuriously emitted, or sputtered, from the cathode may interfere with the optical transmission if it accumulates on cylinder 11, or particularly if it collects on window 17, while material may similarly be emitted from the anode as a result of electron bombardment. Moreover, the cathode dark space, a region of gas inhomogeneities adjacent the cathode, should not be permitted to extend into the usable discharge region because it may interfere with the desired maser action. The constricted portions 20 and 21 of the tube appendages inhibit the effects of sputtering and concentrate the gas discharge so that the current density therein approximates that in cylinder 11, but they obviously contribute to the fragility of the device. Another disadvantage of the device of FIG. 1 is that its mechanical length considerably exceeds the length of the usable gas discharge path which extends only between constricted portions 20 and 21.

These disadvantages are overcome by the mechanically efficient and symmetrical device of FIG. 2 which is constructed in accordance with the present invention. The device 23 comprises a central cylinder 24 which defines a substantially linear usable gas discharge path portion. Surrounding each of the open ends of cylinder 24 are enclosures 25 and 26. The enclosures comprise bulbous portions 27 and 28 and cylindrical portions 29 and 30. One end of cylindrical portion 29 defines an optically transparent window 32 while a corresponding end of cylindrical portion 30 defines an optical window 33. Contained within bulbous portion 27 is a conventional mesh cathode 34 which surrounds the central cylinder as shown in FIG. 3. A triangular-shaped anode 36 likewise surrounds cylinder 24 and is contained within bulbous portion 28 of enclosure 26 as shown in FIG. 4. Device 23 is evacuated in a conventional manner by tubulation 37 and is filled with an active gas medium which is suitable for optical maser operation such as a mixture of helium and neon.

A gas discharge is established along cylinder 24 in a conventional manner by an appropriate direct current potential between cathode 34 and anode 36. Cathode 34 is shown as being a conventional "hot" cathode which emits electrons which collide with gas molecules to initiate the gas breakdown, but it could also be a "cold" cathode in which case a triggering mechanism would normally be included for initiating the breakdown. It can be seen that the gas discharge path extends along a U-shaped path from cathode 34 through cylindrical portion 29 and back through the central cylinder 24, and another U-shaped path from cylinder 24 through cylindrical portion 30 and back to anode 36. The mechanical length of the device can be minimized by locating windows 32 and 33 as near to the ends of cylinder 24 as is commensurate with the maintenance of the gas discharge therebetween. For most purposes, the distance between the end of cylinder 24 and windows 32 and 33 should be approximately equal to the diameter of cylinder 24 to avoid interference with the gas discharge and to maintain a substantially homogeneous current density. With this arrangement, the length of the usable gas discharge path along the central axis of cylinder 24 is almost equal to the mechanical length of the entire device; this maximizes the gain for the length of the device as a whole.

By comparison to FIG. 1 it can be appreciated that the device of FIG. 2 offers obvious advantages of compactness and ruggedness. The electrodes can be set back as far from their corresponding windows as is reasonably desired for preventing cathodic and anodic sputtering onto the windows and for prohibiting extension of the cathode dark space into the cylinder 24; the only limitation appears to be the higher voltages that are required for maintaining longer discharge paths. The anode may be constructed to cover a rather large area, as is frequently desired for dissipating heat, without adding appreciably to the bulk of the device. The mechanical symmetry of the device permits it to be inserted in a rather constricted aperture as is frequently desired when the device is to be used as part of a larger package which includes various other electronic equipment. This is a particularly desirable feature if the device is to be contained within a magnet, as has been recently proposed for tuning devices of this type. Its symmetry, of course, also enables the device to withstand relatively severe shocks because there are no eccentric projections which will easily snap off.

It should be noted that the bulbous portions containing the electrodes are set back from the ends of cylinder 24 and completely surround the cylinder, which gives them solid mechanical support. Additional support may also be included between the cylinder and cylindrical portions 29 and 30 if so desired. The cylindrical portions are normally of smaller diameter than the bulbous portions to give a gas discharge current density that conforms to that in cylinder 24, and also to intercept sputtered material from the electrodes. If, however, smaller electrodes are used, it may be desirable to use bulbous portions having diameters that more closely approximate those of the cylindrical portions.

The central tube and enclosures of the device of FIG. 2 may be made of any of a number of materials which are suitable for containing a gas discharge, such as for example, a glass designated in the art of 7052 glass. Frequently, design considerations require that the central cylinder have a very small inner diameter for supporting a highly concentrated gas discharge. A modified version of the invention which is shown on FIG. 5 comprises a central cylinder made of quartz which is highly resistant to the heating that accompanies a highly concentrated gas discharge. Device 230 of FIG. 5 contains all the elements of device 23 of FIG. 2, these elements being designated by multiples of 10 of the corresponding reference numerals of FIG. 2. The middle portion of the central quartz cylinder 240 is surrounded by an outer glass envelope 390, to which the enclosures 260 and 250 are hermetically sealed. Exhaust tubulation 370 is sealed to envelope 390 rather than to one of the enclosures. The separation between the envelope 390 and the quartz cylinder 240 is sufficiently small to prevent a gas discharge breakdown therebetween. For example, if the inner diameter of the cylinder 240 is 2.5 millimeters, a separation between the tube 240 and the envelope 390 of 0.25 millimeter is sufficiently small under normal conditions of voltage and gas pressure to prevent the formation of a gas discharge path in the gap between the envelope and the quartz cylinder. With this construction, the gas discharge will follow U-shaped paths through the two enclosures as described with reference to FIG. 2.

The inclusion of envelop portion 390 is advantageous for two reasons. First, although quartz is highly heat resistant, it is relatively permeable to certain gases, that is, certain gases can diffuse through the quartz cylinder. Most conventional glasses, such as 7052 glass, are impermeable to gas so that envelope 390, together with the glass enclosures, captures and retains the diffused gas within the device. Secondly, before gas is admitted to the device during its fabrication, it is important that all of the air be evacuated from it. If the inner diameter of cylinder 24 of FIG. 2 is very small, exhaust apparatus connected to tubulation 37 may not readily evacuate entirely enclosure 26 because of the tortuous path that the air must follow in reaching tubulation 37. Tubulation 370 of FIG. 5, on the other hand, is more directly connected to both of the enclosures and can usually be more effective in evacuating the entire device and also in distributing the active gas medium evenly throughout the device after evacuation.

Whereas the mesh cathode 34 of FIG. 2 is shown as surrounding central cylinder 24, it may be displaced to one side of the cylinder as shown more clearly in FIG. 6. This may be desired to conserve power input to the cathode by presenting less cathode surface to direct radiation outwardly through the bulbous enclosure. It is clear that various combinations of the modifications that have been shown can be incorporated in any of a number of ways to comply with various design requirements. Numerous other modifications and embodiments may be devised by those skilled in the art without departing from the spirit and scope of our invention.

Communications systems of the kind in which optical masers in accordance with the invention can be incorporated are described, for example, in the U.S. Pat. No. 2,929,922, of A. L. Shawlow and C. H. Townes, issued Mar. 22, 1960.

What is claimed is:

1. In an optical maser the combination comprising:
an elongated linear hollow tubulation;
said tubulation being open at both ends;
two enclosures each surrounding opposite ends of the tubulation;
each of the enclosures having one end defining a transparent window for admitting light to the tubulation;
said tubulation and enclosures containing an active gaseous medium;
means for initiating a gas discharge through the interior of the tubulation comprising a cathode in one enclosure and an anode in the other enclosure;
the cathode and anode each being displaced a substantial distance from the ends of the tubulation and each surrounding a portion of the tubulation.

2. In an optical maser of the type employing an extended gas discharge, the combination comprising:
an elongated hollow tube for defining a substantially linear gas discharge path portion;
said tube having an upstream end and a downstream end;
a first enclosure surrounding the upstream end of the cylinder;
a second enclosure surrounding the downstream end of the cylinder;
a portion of the first enclosure intercepting the tube axis and defining a first light transparent window;
a portion of the second enclosure intercepting the tube axis and defining a second transparent window;
a cathode being located in the first enclosure in a downstream direction from the upstream end of the tube;
and an anode located in the second enclosure in an upstream direction from the downstream end of the tube;
said cathode and anode comprising means for establishing a gas discharge path through the first enclosure, the tube, and the second enclosure which describes substantially 360 degrees.

3. In an optical maser of the type employing an extended gas discharge, the combination comprising:
an elongated hollow tube for defining a substantially linear gas discharge path portion;
said tube being open at both ends;
a first enclosure surrounding one end of the tube;
a second enclosure surrounding the other end of the tube;
each of the enclosures comprising a bulbous portion and a cylindrical portion coaxial with the tube and overlapping an end of the tube;
two transparent windows each enclosing the overlapping end of a cylindrical portion for admitting light to the tube;
each of the bulbous portions surrounding a discrete portion of the tube;
a cathode located within the bulbous portion of the first enclosure;
and an anode located within the bulbous portion of the second enclosure;
the anode and cathode being displaced from the windows a distance sufficient to substantially prevent cathodic and anodic sputtering of material onto the windows.

4. The combination of claim 3 wherein one end of each of the bulbous portions is hermetically sealed to the tube.

5. The combination of claim 3 further comprising:
an envelope surrounding the middle portion of the tube;
the gap between the tube and the envelope being substantially smaller than the diameter of the tube;
and wherein each of the bulbous portions are vacuum sealed to the envelope.

6. The combination of claim 3 wherein the cathode surrounds the tube and the anode surrounds the tube.

7. The combination of claim 3 wherein at least part of both of the windows are separated from the ends of the tube by a distance substantially equal to the inner diameter of the tube.

8. In an optical maser of the type employing an extended gas discharge, the combination comprising:
an elongated hollow cylinder having first and second open ends for defining a substantially linear gas discharge path portion;
a first enclosure having first and second end portions surrounding the first open end of the cylinder;
a second enclosure having first and second end portions surrounding the second end of the cylinder;
the first end portion of the first enclosure completely enveloping the first open end of the cylinder;
the first end portion of the second enclosure completely enveloping the second open end of the cylinder;
a cathode located within the first enclosure and displaced from the first open end of the cylinder in the direction of the second end of the cylinder;
an anode located within the second enclosure and displaced from the second open end of the cylinder in the direction of the first end of the cylinder;
said cathode and anode comprising means for establishing a gas discharge;
and means for constraining the gas discharge to follow a path extending from the cathode through the interior of the cylinder, to the anode.

9. The combination of claim 8 wherein:
the constraining means comprises a hermetic seal between the second end portions of the first and second enclosure and the exterior of the hollow cylinder.

10. The combination of claim 8 wherein:
the constraining means comprises an envelope surrounding a middle portion of the cylinder and hermetically sealed to the second end portions of the first and second enclosures;
the envelope being sufficiently close to the cylinder to prohibit any gaseous breakdown therebetween.

11. In an optical maser, the combination comprising
a closed vessel;
a fluid capable of maser action enclosed in said vessel;
a barrier dividing said vessel into two reservoirs containing said fluid;
an elongated plasma tube in said vessel passing through said barrier to interconnect said reservoirs; and
power means coupled to said fluid for establishing an inverted population in the fluid within said plasma tube.

12. In an optical maser, the combination comprising:
an elongated linear hollow tubulation;
said tubulation being open at both ends;
two enclosures each surrounding opposite ends of the tubulation;
each of the enclosures having one end defining a transparent window for admitting light to the tubulation;
said tubulation and enclosures containing an active gaseous medium;
means for initiating a gas discharge through the interior of the tubulation comprising a cathode in one enclosure and an anode in the other enclosure;
the cathode and anode each being displaced a substantial distance inwardly along the tubulation from the ends of the tubulation; and
means for constraining the gas discharge between the cathode and the anode to follow a path from the cathode through the interior of the tubulation to the anode.